2,858,231

SOUND-DEADENING COMPOSITION OF MATTER

William B. Watson, Park Forest, Ill., assignor to Sinclair Refining Company, New York, N. Y., a corporation of Maine No Drawing. Application January 14, 1954
Serial No. 404,139

4 Claims. (Cl. 106—285)

My invention relates to the production of novel compositions useful as materials for the deadening of sound.

Compositions containing fillers such as fibrous materials are widely used for coating surfaces to insulate them against sound. For example, compositions are used to undercoat and sound-deaden automobile bodies, to coat and sound-deaden automobile door panels, deck lids and roof sections and for ceilings and flat roofs on buildings. These compositions usually comprise a filler material, for example, asbestos, rag felt, etc., which aids in the deadening of sound, and a binding material such as asphalt. A desirable binding material should aid in the deadening of sounds and, in addition, should be flexible and not tend to crack and chip in cold weather.

I have found that aromatic petroleum resin fractions surprisingly have superior sound-deadening efficiency as compared to other petroleum products and serve as effective binders of special value for filler materials in the preparation of sound-deadening compositions. For example, the rate of sound decline for an aromatic resin having a viscosity at 210° F. of 8,000 Saybolt Universal seconds surprisingly is 30.5 decibels per second as compared to only 17.0 decibels per second for a naphthenic base asphalt, while paraffinic type (Pennsylvania) resins, air-blown asphalts and air-blown lubricating oil extracts have sound decline values of less than 17.0 decibels per second.

The compositions of my invention comprise a filler material and an aromatic petroleum resin fraction. The two materials are blended together in any suitable manner, for example, by saturating the filler material with the aromatic resin. The resulting compositions provide excellent materials for use in the deadening of sound which display superior sound-deadening efficiency. Moreover, the aromatic petroleum resin fraction is flexible and does not tend to chip or crack in cold weather, thereby providing an advantageous binder.

The aromatic petroleum resin fractions useful in my compositions are the high viscosity aromatic residual materials remaining after treatment of heavy petroleum distillates and lubricating oil stocks obtained from naphthenic or asphalt base crudes and mixed, i. e. Mid-Continent, base crudes. The resins contain the aromatic constituents of the crude oil with a minimum of paraffinic, naphthenic and asphaltic materials. The aromatic resin fractions are obtained by solvent, e. g. phenol, furfural, nitrobenzene, etc., extraction of heavy bright stocks having a viscosity of more than about 1500 Saybolt Universal seconds at 210° F.; by propane or butane fractionation of the lubricating oil extracts obtained from conventional solvent treating of bright stock lubricating oils; by vacuum distillation of the lubricating oil extracts obtained from solvent treating bright stock lubricating oils; and by chromatographic separation of heavy petroleum distillates and residuals using alumina clay or similar earths as the adsorbent. The aromatic resin fractions are characterized by an API gravity of below about 8.0, a ring and ball softening point of about 100 to 150° F., a needle penetration at 77° F. (100 grams/5 secs.) of about 10 to 200, a high viscosity of about 2,000 to 15,000 Saybolt Universal seconds at 210° F. and a low viscosity index of below about minus 100.

As an example of the preparation of an aromatic petroleum resin useful in my compositions, a lubricating oil extract was prepared by phenol extraction of a bright stock lubricating oil having a viscosity at 210° F. of 120 Saybolt Universal seconds. The extract had an API gravity of 11.5, a viscosity in Saybolt Universal seconds of 6,787 at 130° F. and 337 at 210° F., a viscosity index of −63 and a carbon residue of 4.176 weight percent. The extract was then treated with propane in a conventional countercurrent extraction tower to obtain the aromatic resin. The tower was operated under a pressure of 600 pounds per square inch gauge and at a top tower temperature of 157° F. and a bottom tower temperature of 133° F. The propane to extract feed ratio was 8.6 to 1. A yield of aromatic resin (bottoms product) of 10.7 volume percent was obtained. The aromatic resin had an API gravity of 3.4, a softening point (ring and ball) of 125° F., a needle penetration at 77° F. (100 grams/5 secs.) of 19, a viscosity of 8,300 Saybolt Universal seconds at 210° F. and an approximate viscosity index of −2,000.

By the term filler material, useful in the compositions of my invention, I mean to include materials such as sand, clay, gilsonite, vermiculite and ground cork as well as fibrous materials such as rag felt, roofing felt, and wood flour and inorganic fibers, e. g. asbestos fiber, ground mica, glass fiber, and combinations of any of these materials.

The proportion of aromatic resin used in the compositions depends on the nature of the filler material and the intended use of the compositions. The aromatic resin and filler compositions may be blended with solvents or emulsifiers, or coated with asphalts depending upon the intended use of the composition. Compositions blended with solvents are particularly useful for undercoating automobiles and for coating and sound-deadening automobile body parts and building ceilings and roofs. Solvents such as petroleum naphtha and mineral spirits are useful for blending. A typical example of a solvent-blended composition suitable for undercoating automobiles is 35 parts of an aromatic resin fraction of a viscosity of about 8,000 SUS at 210° F., 35 parts of asbestos fibers and 30 parts of mineral spirits (290–350° F. boiling range). A typical example suitable for coating and sound-deadening automobile door panels, deck lids, and roof sections and for sound-deadening ceilings and flat roofs of buildings is 28 parts of an aromatic resin fraction of a viscosity of about 8,000 SUS at 210° F., 42 parts of asbestos fibers, 30 parts of mineral spirits (290–350° F. boiling range).

Aromatic resin and filler blends emulsified with an emulsifier such as soap are particularly advantageous for undercoating automobiles. A typical example of an emulsified blend suitable for undercoating automobiles is 25 parts of an aromatic resin fraction of a viscosity of about 5,000 SUS at 210° F., 25 parts of ground cork, 49 parts of water and 1 part of soap emulsifier.

Aromatic resin and filler blends which are coated with asphalt are particularly advantageous for coating and sound-deadening automobile bodies and buildings or other structures. For example, layers or mats of roofing felt, asbestos fibers, or glass fibers which have been saturated with aromatic resin are coated with roofing asphalt (air-blown asphalts with ring and ball softening points of about 180 to 230° F. and needle penetrations at 77° F. of about 15 to 30). If desired, the surface may be subsequently embedded with a small amount of slate or limestone dust. A typical example suitable for sound-deadening automobile bodies and buildings or other structures is prepared as follows: A 15.8 pound per square (108 square feet) rag felt is saturated with 140 weight percent (22.0 pounds per square) of an aromatic resin fraction of a viscosity of about 2,500 SUS at 210° F. Each side is then coated with 10 pounds per square of an air-blown asphalt of a 220 softening point (ring and ball) and 20 needle penetration at 77° F. If desired, layers of this material may be cemented together with an aromatic resin fraction of a viscosity of about 5,000 SUS at 210° F. in order to increase the thickness and subsequent sound-deadening effectiveness.

I claim:

1. A sound-deadening composition consisting essentially of a sound-deadening filler material selected from the group consisting of sound-deadening fibrous material and cork, and an aromatic petroleum resin fraction having an API gravity of below about 8.0, a ring and ball softening point of about 100 to 150° F., a needle penetration at 77° F. of about 10 to 200, a viscosity in Saybolt Universal seconds at 210° F. of about 2,000 to 15,000 and a viscosity index below about minus 100 wherein the proportion of the filler material to the resin is from about 0.7 to 1.5 parts to 1 part.

2. A sound-deadening composition consisting essentially of rag felt and an aromatic petroleum resin fraction having an API gravity of below about 8.0, a ring and ball softening point of about 100 to 150° F., a needle penetration at 77° F. of about 10 to 200, a viscosity in Saybolt Universal seconds at 210° F. of about 2,000 to 15,000 and a viscosity index below about minus 100; wherein the proportion of rag felt to resin is about 0.7 parts to 1 part.

3. A sound-deadening composition consisting essentially of asbestos fiber and an aromatic petroleum resin fraction having an API gravity of below about 8.0, a ring and ball softening point of about 100 to 150° F., a needle penetration at 77° F. of about 10 to 200, a viscosity in Saybolt Universal seconds at 210° F. of about 2,000 to 15,000 and a viscosity index below about minus 100; wherein the proportion of asbestos fiber to the resin is from 1 to 1.5 parts to 1 part.

4. A sound-deadening composition consisting essentially of cork and an aromatic petroleum resin fraction having an API gravity of below about 8.0, a ring and ball softening point of about 100 to 150° F., a needle penetration at 77° F. of about 10 to 200, a viscosity in Saybolt Universal seconds at 210° F. of about 2,000 to 15,000 and a viscosity index below about minus 100; wherein the proportion of cork to the resin is about 1 part to 1 part.

References Cited in the file of this patent

UNITED STATES PATENTS 1,989,045     Merrill  ---------------- Jan. 22, 1935